United States Patent
Sawamura

(10) Patent No.: US 8,990,578 B2
(45) Date of Patent: Mar. 24, 2015

(54) PASSWORD AUTHENTICATION CIRCUIT AND METHOD

(71) Applicant: Renesas Electronics Corporation, Kanagawa (JP)

(72) Inventor: Hiroto Sawamura, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 5 days.

(21) Appl. No.: 13/735,629

(22) Filed: Jan. 7, 2013

(65) Prior Publication Data
US 2013/0179966 A1 Jul. 11, 2013

(30) Foreign Application Priority Data

Jan. 6, 2012 (JP) ................................. 2012-001438

(51) Int. Cl.
G06F 12/14 (2006.01)
G06F 21/31 (2013.01)
G06F 9/312 (2006.01)

(52) U.S. Cl.
CPC ....................................... G06F 21/31 (2013.01)
USPC .............. 713/183; 713/193; 713/194; 380/36

(58) Field of Classification Search
None
See application file for complete search history.

(56) References Cited

U.S. PATENT DOCUMENTS

| | | | | |
|---|---|---|---|---|
| 5,267,299 A | * | 11/1993 | Nomura | 379/88.02 |
| 6,021,460 A | * | 2/2000 | Hirate | 711/100 |
| 6,141,774 A | * | 10/2000 | Mattheis | 714/27 |
| 6,950,345 B1 | * | 9/2005 | Tokiwa | 365/185.22 |
| 7,600,128 B2 | * | 10/2009 | Pritchard et al. | 713/184 |
| 7,869,153 B1 | * | 1/2011 | Tan et al. | 360/67 |
| 8,239,920 B2 | | 8/2012 | Nakazawa | |
| 2002/0050922 A1 | * | 5/2002 | Sashida | 340/5.72 |
| 2006/0075485 A1 | * | 4/2006 | Funahashi et al. | 726/19 |
| 2006/0242425 A1 | * | 10/2006 | Ishida | 713/183 |
| 2008/0201768 A1 | * | 8/2008 | Koo et al. | 726/6 |
| 2009/0024882 A1 | * | 1/2009 | Kim et al. | 714/700 |
| 2009/0260078 A1 | | 10/2009 | Nakazawa | |

FOREIGN PATENT DOCUMENTS

JP 2009-258840 A 11/2009

* cited by examiner

Primary Examiner — Venkat Perungavoor
(74) Attorney, Agent, or Firm — McDermott Will & Emery LLP

(57) ABSTRACT

A password authentication circuit includes a timer that measures first and second periods of a password authentication period, a control circuit that, in a first period, disables writing of a password received into a password register, in a predetermined period within a second period enables writing of a password received into the password register and outside the predetermined period within the second period disables writing of a password received into the password register; a password comparison unit that compares a password in the password register and a password expected value to perform authentication of the password; and a first period generation unit that controls variably the first period, a password last written into the password register in the predetermined period of the second period being made a target for authentication.

11 Claims, 6 Drawing Sheets

PASSWORD AUTHENTICATION CIRCUIT AND METHOD

REFERENCE TO RELATED APPLICATION

This application is based upon and claims the benefit of the priority of Japanese patent application No.2012-001438, filed on Jan. 6, 2012, the disclosure of which is incorporated herein in its entirety by reference thereto.

TECHNICAL FIELD

The present invention relates to a password authentication circuit and method.

BACKGROUND

A device or system that encrypts digital video content such as digital television has become to be used for the sake of copyright protection. Highly confidential information or secret data such as an encryption key required for the encryption of content is stored in a memory included in a semiconductor integrated (LSI) circuit and hence there is an increasing need to improve security strength for semiconductor devices.

Patent Literature 1 discloses an arrangement to improve security against an attack from a malicious user without deteriorating convenience for a legitimate user, by increasing delay time that delays a response to a key operation in accordance with the number of times that password authentication has failed. A summary of Patent Literature 1 is described below (refer to Patent Literature 1 for details).

A delay time D, that is a time from a key operation on an operation part until the generation of a response, is computed according to the following expression.

$$D = S \cdot \log_2(C+1) \tag{1}$$

Here, the parameter S is a coefficient that can be arbitrarily set in advance by a legitimate user, and is referred to as a security level S. The parameter C is the number of times that authentication has failed.

The delay time D of a response to a key operation increases logarithmically in accordance with the number C of authentication failures. Furthermore, the delay time D increases in accordance with the security level S set in advance by the user. The security level S can be arbitrarily set by the user, for example, to an integer from 1 to 10. The higher the security level, the longer the delay time D.

[Patent Literature 1] JP Patent Kokai Publication No. JP-P2009-258840A

SUMMARY

The entire disclosure of Patent Literature 1 is incorporated herein by reference thereto.

An analysis of related technology is given below.

There is a problem with the related technology disclosed in the above-mentioned Patent Literature 1 in that, since authentication is by password, the technology is weak against a brute force attack. A reason for this is as follows.

The abovementioned related technology delays response to a key operation on an operation part in accordance with the number C of authentication failures, but since the password is provided in a register of fixed length, the password may be deciphered by setting all values, from 0 to the maximum value, in a brute force way, to the register in which the password is set. As a result, access to confidential data becomes possible by input of the deciphered password.

For example, when the delay time D is as in expression (1) (S=10, C=1~2^16, where ^ is a power operator), the time $T_1$ required for a brute force attack is calculated as follows.

$$T_1 = \sum_{C=0}^{2^{16}} \{10 * \log_2(C+1)\} \cong 1966082[\text{sec}] \to 22.7[\text{days}] \tag{2}$$

The time $T_1$ required for a brute force attack is approximately 23 days, as in the abovementioned expression (2). That is, it is rather easy to perform analysis for a legitimate password by a mechanical brute force attack by using a device to automatically generate and input passwords to an authentication device by a brute force attack.

It is necessary to ensure security corresponding to product lifespan and to improve security strength. A password authentication circuit and method are presented below, in which analysis for a legitimate password is difficult, and it is possible to prevent divulging of a legitimate password.

According to one aspect of the embodiments, there is provided a password authentication circuit comprising: a control unit, a password comparison unit, and a first period generation unit.

The control unit includes:

a timer that performs time measurement of each period of at least a first period and a second period, wherein a password authentication period is divided into at least the first period and the second period; and a control circuit that performs control, based on the time measurement of the each period by the timer, such that, in the first period, sets a password register write enable signal to an inactive state to disable writing of a password received into a password register, in a first predetermined period within the second period, sets the password register write enable signal to an active state to enable writing of a password received into the password register, and in a second predetermined period different from the first predetermined period within the second period, sets the password register write enable signal to an inactive state to disable writing of a password received into a password register.

The password comparison unit includes the password register, and a comparison circuit that compares a password written into the password register and a password expected value to perform authentication of the password received.

The first period generation unit generates a signal having a value corresponding to a length of the first period for supply to the timer to control variably the first period. In a case of there being a plurality of passwords written into the password register within the first predetermined period of the second period, a password last written into the password register is made a target for authentication.

According to another aspect of the embodiments there is provided a password authentication method comprising:

performing time measurement of each period of at least a first period and a second period by a timer, wherein a password authentication period is divided into at least the first period and the second period;

performing control, based on the time measurement of the each period by the timer, such that, in the first period, sets a password register write enable signal to an inactive state to disable writing of a password received into a password register, in a first predetermined period within the second period, sets the password register write enable signal to an active state to enable writing of a password received into the password register, and in a second predetermined period different from the first predetermined period within the second period, sets the password register write enable signal to an inactive state to disable writing of a password received into a password register;

comparing a password written into the password register and a password expected value to perform authentication of the password received; and generating a signal indicating a length of the first period for supply to the timer to control variably the first period, in a case of there being a plurality of passwords written into the password register within the first predetermined period of the second period, a password last written into the password register being made a target for authentication.

According to the above described embodiments, it is possible to make analysis for legitimate passwords difficult, while curbing complexity of configuration, and to prevent divulging of legitimate passwords by a brute force attack or the like.

Still other features and advantages will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTIONS OF THE DRAWINGS

PREFERRED MODES

Figure 1:
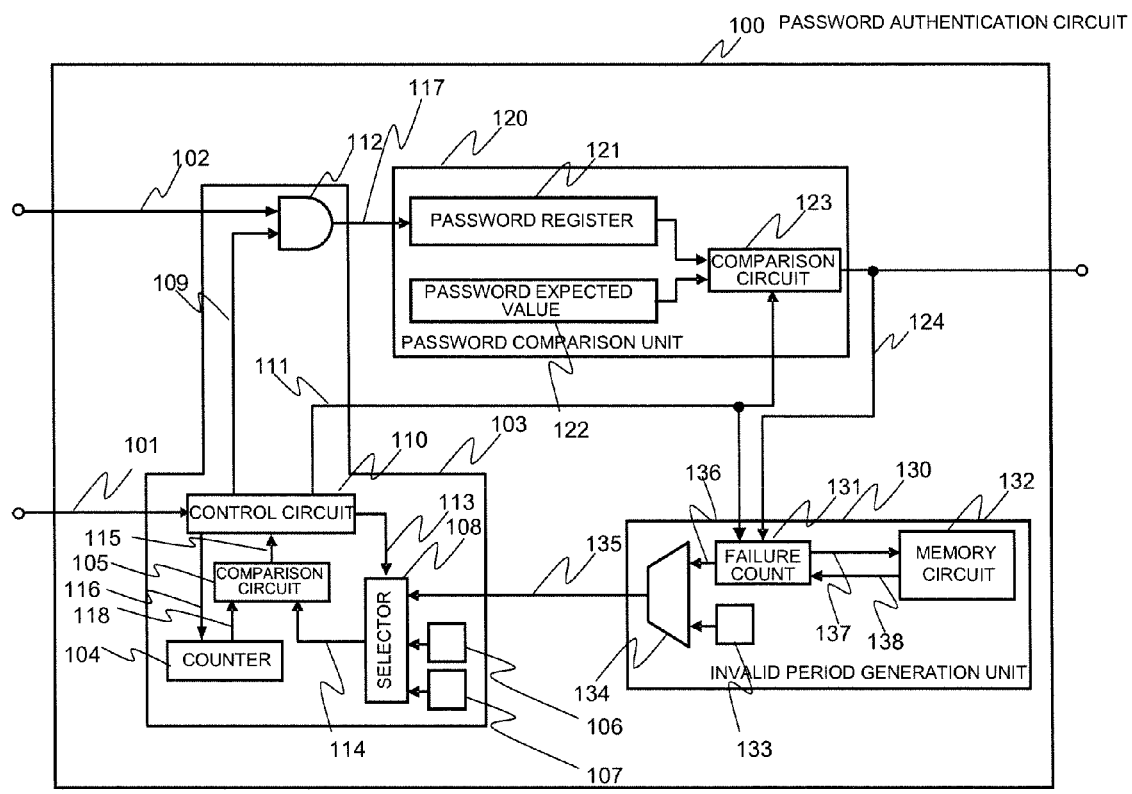
FIG. 1 is a diagram illustrating a configuration of a password authentication circuit in an exemplary embodiment.

Several exemplary embodiments will be described. Referring to FIG. 1, a password authentication circuit (100) according to one of the embodiments includes a control unit (103), a password comparison unit (120), and a first period generation unit (130). The control unit (103) includes a control circuit (110) and a timer that includes at least a counter (104) and a comparison circuit (105). The password comparison unit (120) includes a password register (121), a password expectation value (122), and a comparison circuit (123). The timer in the control unit (103) performs time measurement of each period of the first and second periods, in which a password authentication period is divided into at least a first period and a second period. The control circuit (110) in the control unit (103) performs control, based on time measurement of each period by the timer, such that, in the first period, sets a password register write enable signal (109) to an inactive state and disables writing of a password received (102) into a password register (121), in a first predetermined period within the second period, sets the password register write enable signal (109) to an active state and enables writing of a password received into the password register (121), and in a second predetermined period different from the first predetermined period within the second period, sets the password register write enable signal (109) to an inactive state and disables writing of a password received into the password register (121).

The comparison circuit (123) compares the password written into the password register (121) and a password expectation value (122) to perform authentication of the password received.

The first period generation unit (130) controls variably the first period.

In a case wherein a plurality of passwords have been received within the first predetermined period of the second period, the password last written into the password register (121) is made a target for password authentication.

According to embodiments, in password authentication, in order to prevent divulging of an authenticated password by a brute force attack, a password authentication period is dived into a plurality of periods, for example a first period (invalid period) in which password input is invalid and a second period (including first and second predetermined periods) in which password input is invalid. The writing of a password received in the first period into a password register is invalid. The password input in the first predetermined period (valid period) within the second period is enabled, wherein a password last received among passwords received within the first predetermined period (valid period) within the second period is a target of authentication. A password received in the predetermined second period within the second period (that is, outside of the first predetermined period) is not a target of authentication.

According to one of the embodiments, the first period is variably set based on the password authentication failure count (the number of times that password authentication fails). According to the embodiments, by setting the first predetermined period (a valid period in which password input is enabled) within the second period to be variable, it is possible to make it difficult to analyze input timing of a password to be authenticated (or to analyze when has a password received been authenticated?) and to analyze a legitimate password. Thus, it is possible to prevent divulging of a legitimate password by a brute force attack.

Since a user having a legitimate password can enter a legitimate password at any input timing, information as to the timing at which a password received is made a target of authentication is basically unnecessary (a user having a legitimate password basically does not carry out brute force input). Those that require information as to the timing at which a password received is made a target of authentication are generally, for example, malicious analyzers (password attackers) that carry out a brute force attack. According to the above-mentioned embodiments, information as to when a period, in which password input is enabled, begins and when the period ends is not notified to the outside, and even if an illegitimate-access entity succeeds in password authentication it is difficult for the entity to identify at what point in time a password received is a legitimate password. As a result, it is possible to prevent divulging of a legitimate password.

Conversely, in a case where only one password is received in all the password authentication periods, since a password received in the first period or a password received in a period outside of the first predetermined period of the second period is not written into the password register and is not a target for password authentication, the time required for attempting a brute force attack drastically increases. The ratio of the period in which writing of a password received into the password register to the password authentication period decreases with an increase in the first period and this also increases time required for attempting a brute force attack.

Referring to FIG. 1, the password authentication circuit 100 is provided with a control unit 103, a password comparison unit 120, and a first period generation unit 130 (hereinafter termed invalid period generation unit 130).

The control unit 103 includes a counter 104, a comparison circuit 105, a selector 108, a control circuit 110, and a password write mask circuit 112.

The counter 104 counts a clock signal supplied thereto (not shown in the drawings). The comparison circuit 105 makes a comparison with regard to whether or not a counter value 118 of the counter 104 matches a value 114 corresponding to an authentication period, and performs time measurement of the authentication period. The counter 104 and the comparison circuit 105 function as a timer (timer counter) that performs time measurement of the authentication period (the value 114 received to the comparison circuit 105).

The selector 108, using a signal 113 indicating an authentication period in the present state received from the control circuit 110, selects one of the three values:
a value 106 indicating an authentication valid period,
a value 107 indicating an authentication waiting period, and
a value 135 indicating an invalid period from an invalid period generation unit 130,
and outputs the selected value 114 to the comparison circuit 105.

The password write mask circuit 112 controls writing of the password write signal 102 supplied from a CPU or the like into the password register 121.

The comparison circuit 105 makes a comparison as to whether the value 114 selected by the selector 108 and the counter value 118 output from the counter 104 match, and outputs a match signal 115 to the control circuit 110, when they match.

The control circuit 110 receives an authentication start signal 101 and the match signal 115 from the comparison circuit 105, and supplies a signal 113 indicating the authentication period in the present state as a selection control signal to the selector 108.

The control circuit 110 supplies an initialization signal 116 of the counter 104 to the counter 104.

In addition, the control circuit 110 supplies the password register write enable signal 109 enabling writing of a password into the password register 121, in the authentication valid period, to the password write mask circuit 112.

The control circuit 110 supplies a password comparison valid signal 111 to the password comparison unit 120.

The password write mask circuit 112 receives the write signal 102 to the password register 121 and the password register write enable signal 109 from the control circuit 110, and performs a logical AND operation on the two signals received to output a password register write signal 117 to the password comparison unit 120.

The invalid period generation unit 130 includes an authentication failure count control circuit 131 to count the number of failures of password authentication, a memory circuit 132 to store the authentication failure count at reset or when power supply is OFF (non-volatile RAM (Random Access Memory) (NVRAM), electrically erasable programmable ROM (Read Only Memory) (EEPROM), or the like), an invalid period initial value 133, and an invalid period calculation unit 134.

The authentication failure count control circuit 131 receives a comparison result signal 124 from the password comparison unit 120, and receives a password comparison valid signal 111 from the control unit 103, and performs initialization of the authentication failure count and incrementing of the authentication failure count.

The authentication failure count control circuit 131 receives a value 138 indicating the authentication failure count for the previous time from the memory circuit 132, and outputs a value 137 indicating the authentication failure count in the present state to the memory circuit 132.

The invalid period calculation unit 134 calculates a value 135 indicating an invalid period, from a value 136 indicating the authentication failure count output from the authentication failure count control circuit 131 and the invalid period initial value 133, and outputs to the control unit 103.

The password comparison unit 120 includes a password expected value storage 122 that holds the value of a password, a password register 121 that holds a value set as a password, and a comparison circuit 123 that detects whether or not the set password matches the password expected value 122.

The password register 121 receives output of the password write mask circuit 112, and in a case where the password write signal is valid, performs writing to the password register 121.

The comparison circuit 123 receives a value of the password register 121, a value of the password expected value storage 122, and the password comparison valid signal 111, and in a case where the password comparison valid signal 111 is in an active state, outputs a comparison result signal 124 of the password register 121 and the password expected value storage 122.

Figure 2:
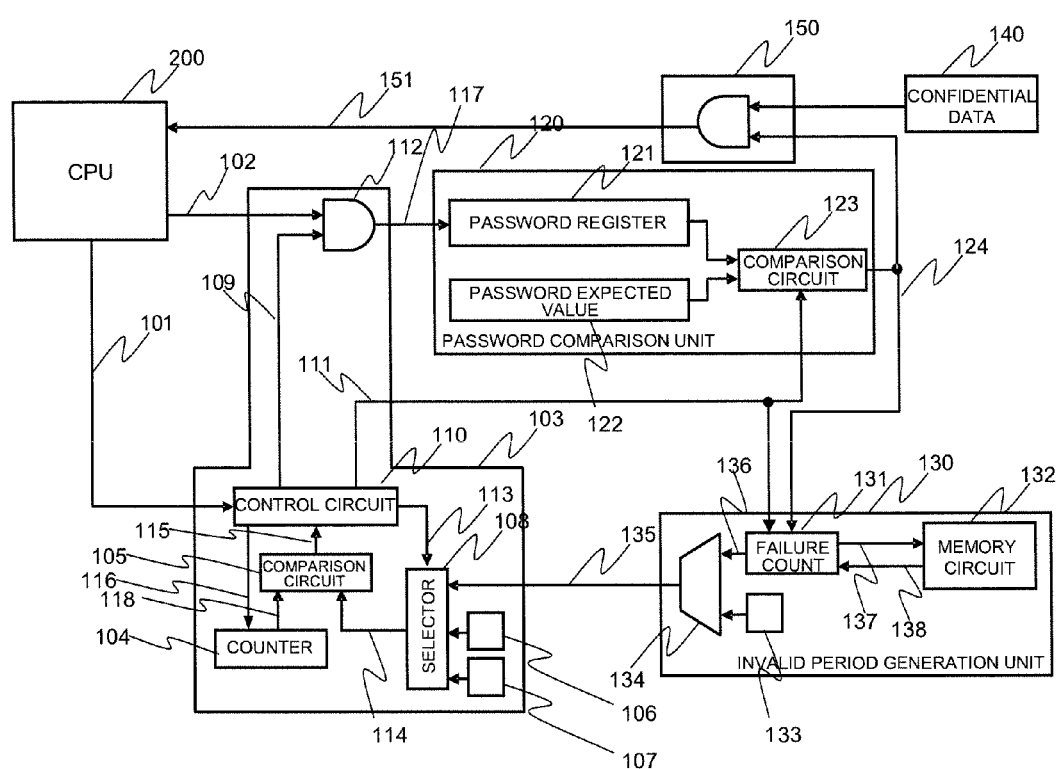
FIG. 2 is a diagram illustrating a device configuration in the exemplary embodiment.

FIG. 2 illustrates an example of a device configuration in which the password authentication circuit 100 of FIG. 1 is used for access control of confidential data. The device of FIG. 2 may be any electronic equipment or information processing device or the like that requires password authentication when used by a user. In a case where a password received is authenticated by the password authentication circuit 100, a CPU (Central Processing Unit) 200 can access (read) the confidential data 140. It is to be noted that FIG. 2 has a configuration in which the confidential data 140 is read by the CPU 200 via a confidential data read mask circuit 150, but clearly there is no limitation to reading of the confidential data 140. For example, in a case where a password is authenticated by the password authentication circuit 100, the CPU 200 clearly may have a configuration where access (writing or reading) is enabled to a specific resource (IO device, file device, database, communication network, or the like).

The CPU 200 outputs an authentication start signal 101 indicating the start of authentication and a password write signal 102 with respect to the password register 121, to the control unit 103 of the password authentication circuit 100, and receives read data 151 after values from the confidential data 140 have been masked. The CPU 200 is a part that manages software control of the entire device and performs a desired operation in accordance with a program stored in a memory, which is not shown in the drawings.

The confidential data read mask circuit 150 receives a comparison result signal 124 from the comparison circuit 123 of the password comparison unit 120 and the confidential data 140, and only in a case where the comparison result signal 124 indicates a match (active state), outputs the confidential data 140 to the CPU 200. In a case where the comparison result signal 124 indicates a non-match, values of the confidential data 140 after masking (for example, all bits=Low) are output to the CPU 200.

Figure 3:
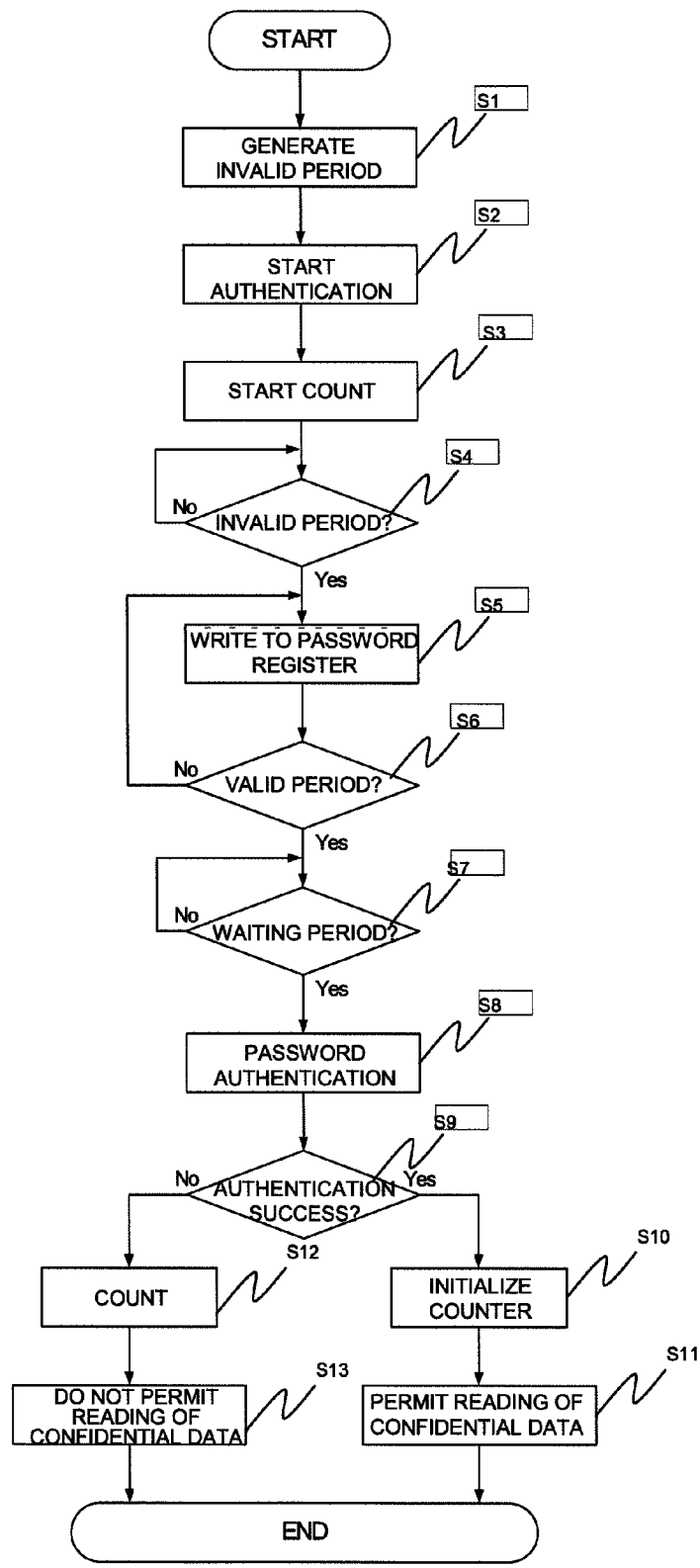
FIG. 3 is a flowchart showing a control procedure in the exemplary embodiment.

The following describes operations of the present exemplary embodiment with reference to a flowchart of FIG. 3.

After release of a reset state such as power-on or the like, the authentication failure count control circuit 131 reads a value 138 indicating the authentication failure count the previous time from the memory circuit 132, and outputs a value 136 indicating the authentication failure count to the invalid period calculation unit 134.

The invalid period calculation unit 134 generates a value 135 indicating an invalid period, from the value 136 indicating the authentication failure count output from the authentication failure count control circuit 131 and the invalid period initial value 133 (step S1).

The CPU 200 notifies the control unit 103 of the start of authentication, with the authentication start signal 101 in an active state (step S2).

The control circuit 110 transitions to an invalid period that is a first period of authentication, and puts the initialization signal 116 of the counter 104 in an active state.

The counter 104 is initialized to an initial value (for example, zero) by the initialization signal 116 of the counter, and sequentially counts upward from the initial value (step S3).

When the control circuit 110 outputs a value of "invalid period", which is the first period of authentication, in the signal 113 indicating an authentication period in the present state, the selector 108 selects the value 135 indicating an invalid period, and outputs with the selected value 114.

The comparison circuit 105 compares the selected value 114 and the counter value 118. When the counter value 118 of the counter 104 is counted up to reach the selected value 114 (the invalid period), the comparison circuit 105 outputs a match signal 115 in an active state and the control circuit 110 is notified that the invalid period has elapsed.

During the invalid period, the control circuit 110 holds the password register write enable signal 109 in an inactive state and hence writing from the CPU 200 by the password write signal 102 into the password register is masked by the password write mask circuit 112 (step S4).

When receiving a match signal 115 in an active state, the control circuit 110 transitions to a valid period, which is the second period of authentication, and sets the password register write enable signal 109 to an active state.

When the CPU 200 performs writing to the password register 121 by the password write signal 102 to the password register 121, the password write signal 102 passes through the password write mask circuit 112, the password register write signal 117 becomes valid, and writing to the password register 121 becomes enabled (step S5).

The control circuit 110 outputs a value of "valid period" in a signal 113 indicating the authentication period, the selector 108 selects a value 106 indicating an authentication valid period, and outputs the value of the authentication valid period with the selected value 114. The comparison circuit 105 compares the selected value 114 (the authentication valid period) and the counter value 118. In a case of a match, the comparison circuit 105 outputs the match signal 115 in an active state (outputs a one shot pulse), and the control circuit 110 is notified that the valid period has elapsed (step S6).

On receiving the match signal 115 in an active state from the comparison circuit 105, the control circuit 110 detects that the authentication valid period has ended, transitions to a waiting period, and outputs a value of "waiting period" with a signal 113 indicating an authentication period in the present state, and also puts the initialization signal 116 of the counter in an active state to initialize the counter 104.

The selector 108 selects a value 107 indicating an authentication waiting period and outputs with the selected value 114.

The comparison circuit 105 compares the selected value 114 and the counter value 118, and in a case of a match, the match signal 115 is put in an active state, and the control circuit 110 is notified that the waiting period has elapsed (step S7).

On receiving the match signal 115 in an active state from the comparison circuit 105, the control circuit 110 detects that the waiting period has ended, and puts the password comparison valid signal 111 in an active state (step S8).

The comparison circuit 123 compares the value of the password register 121 and the password expected value 122, and when they match, sets the comparison result signal 124 to an active state. When they don't match, the comparison circuit 123 sets the comparison result signal 124 to an inactive state (step S9).

In a case of authentication success, the authentication failure count control circuit 131 initializes the authentication failure count, and writes a value 137 indicating the authentication failure count in the present state to the memory circuit 132 (step S10).

After the authentication success, it becomes possible for the CPU 200 to read the value of the confidential data 140 (step S11).

In a case of authentication failure, the authentication failure count control circuit 131 increments (+1) the authentication failure count, and writes a value 137 indicating the authentication failure count in the present state to the memory circuit 132 (step S12).

After the authentication failure, the CPU 200 cannot read values of the confidential data 140 (step S13). With the comparison result signal 124 inactive, the confidential data read mask circuit 150 puts all the read data 151, which is output thereof, to 0, for example.

Figure 4:
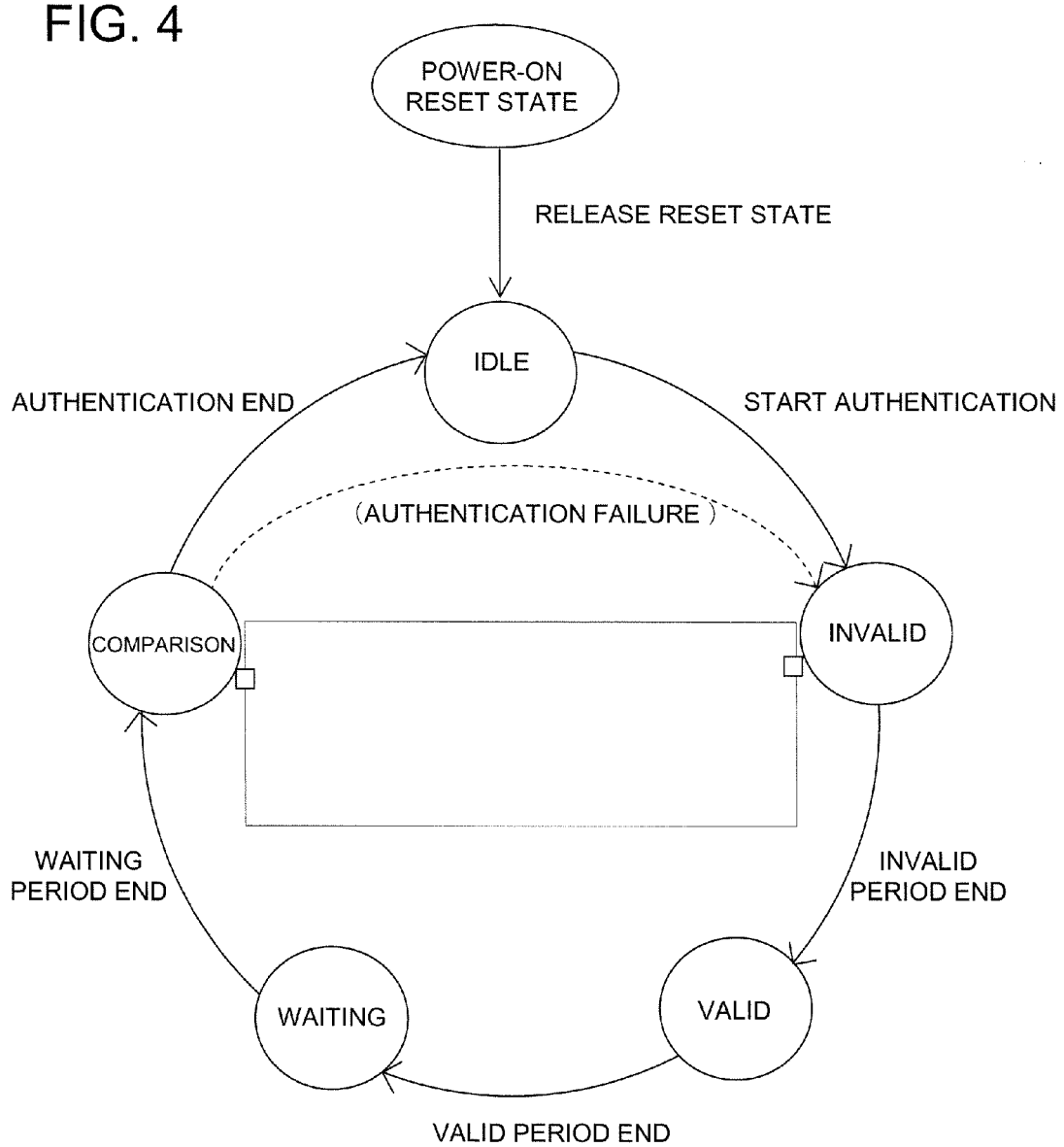
FIG. 4 is a diagram illustrating state transitions of a control circuit in the exemplary embodiment.

The following describes the control circuit 110 with reference to FIG. 4 illustrating a state transition of the control circuit 110. When a reset state, such as a power-on reset when the power supply is turned ON or a forced reset, is released, the control circuit 110 is in an idle state. In this state, when the authentication start signal 101 is activated, the state transitions to an invalid state. The control circuit 110 puts the signal 113 indicating an authentication period in an invalid state and the password register write enable signal 109 in an inactive state.

When the invalid period is ended, the state transitions to a valid state. The control circuit 110 puts the signal 113 indicating an authentication period in a valid state (authentication valid period), and the password register write enable signal 109 in an active state.

When the valid period (authentication valid period) is ended, the state transitions to a waiting state. The control circuit 110 puts the signal 113 indicating an authentication period in a waiting period (authentication waiting period), and the password register write enable signal 109 in an inactive state.

When the waiting period (authentication waiting period) is ended, the state transitions to an authentication state, and the control circuit 110 activates the password comparison valid signal 111. When the authentication is complete, in a case of authentication success, the state transitions to an idle state. In a case of authentication failure, when the authentication start signal 101 is activated, the state may return again to an invalid state, as shown by the broken line in FIG. 4. It is to be noted that although specific to the implementation, in a case of password authentication failure continuing a predetermined number of times, clearly the CPU 200 may be notified and password authentication may be discontinued.

Figure 5:
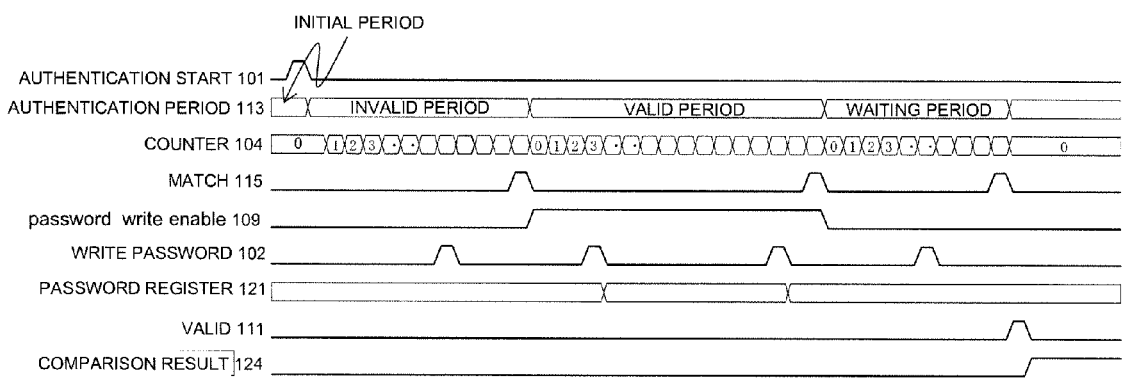
FIG. 5 is a timing diagram illustrating timing operation in the exemplary embodiment.

The following describes an example of operation of the password authentication circuit 100 with reference to FIG. 5. In FIG. 5, signal waveforms of: the authentication start signal 101, the signal 113 indicating the authentication period, the counter value of the counter 104, the match signal 115, the password register write enable signal 109, the password write signal 102, the password register 121, the password comparison valid signal 111, and the comparison result signal 124 of FIG. 2 are shown.

When the CPU 200 starts authentication processing by having the authentication start signal 101 in an active state, the counter 104 starts a count, and the state transitions to the 3 states of: invalid period→valid period (authentication valid period)→waiting period (authentication waiting period). When an invalid period is timed by the counter 104 (when the count value of the counter 104 matches a value 135 indicating an invalid period), a match signal 115 (one shot pulse) is output from the comparison circuit 105, the state transitions to a valid period (authentication valid period), the control circuit 110 puts the password register write enable signal 109 in an active state, and when a valid period is timed by the counter 104 (when the count value of the counter 104 matches a value 106 indicating an authentication valid period), a match signal 115 (one shot pulse) is output from the comparison circuit 105, and the state transitions to a waiting period (authentication waiting period). In the waiting period, the control circuit 110 puts the password register write enable signal 109 in an inactive state, and when the waiting period is timed by the counter 104 (when the count value of the counter 104 matches a value 107 indicating an authentication waiting period), a match signal 115 (one shot pulse) is output from the comparison circuit 105, the control circuit 110 activates the password comparison valid signal 111 (one shot pulse), and in response to the activation of the password comparison valid signal 111, the comparison circuit 123 compares a value written into the password register 121 with the password expected value 122.

As shown in FIG. 5, in an invalid period even if the CPU 200 performs writing to the password register 121 by a password write signal 102 to the password register 121, since the password register write enable signal 109 is inactive, it is not possible to rewrite the password register 121.

During a valid period, it is possible to write to the password register 121 any number of times (in FIG. 5, the password write signal 102 to the password register 121 from the CPU 200 is activated twice), and the value last written into the password register 121 is valid.

If a password is received during the waiting period, since a value is not held in the password register 121, the comparison circuit 123 is not useable for authentication.

If a malicious analyzer (password attacker) writes a legitimate password in an invalid period or an authentication waiting period, the authentication will fail. Accordingly, even if a mechanical brute force attack is carried out, a legitimate password cannot be identified from a password received during an invalid period or an authentication waiting period. In particular, regarding the invalid period, the authentication valid period, and the authentication waiting period, by having a configuration in which the length of the authentication valid period can be controlled so as to be variable, for example by respective cycle units, even if passwords are continuously received in a brute force manner, it is difficult to identify the point in time at which a password received is valid.

In this way, according to the present exemplary embodiment, the length of the password invalid period can be varied in accordance with the authentication failure count, and by providing an authentication valid period and an authentication waiting period following thereon, it is possible to lengthen analysis time for a malicious analyzing entity, and it is possible to prevent divulging of a legitimate password by a brute force attack. Calculation of analysis time is performed under conditions of password length being 16 bits, and the authentication failure count being $N=2^{16}=65536$. Delay time calculation is performed under the same conditions as the related technology. An authentication password is written to the password registry only once during the authentication valid period.

Assuming that the value 135 indicating the invalid period is a, the invalid period initial value 133 is $\Delta\alpha$, the value 106 indicating the authentication valid period is $\beta$, and the value 107 indicating the authentication waiting period is $\gamma$, an algorithm for generating $\alpha$, and the values of $\beta$ and $\gamma$, are as in the expressions:

$$\alpha_{(N)}=\alpha_{(N-1)}+\Delta\alpha\times N,\ \alpha_{(0)}=0,\ \Delta\alpha=0.5\ [\text{sec}],\ \beta+\gamma=0.5\ [\text{sec}]$$

and the analysis time $T_2$ requires approximately 34 years, as follows.

$$\begin{aligned}T_2 &= \{\alpha_{(1)} + \alpha_{(2)} +, \ldots, +\alpha_{(N)}\} + (\beta+\gamma)\times N &(3)\\ &= \frac{N\times\{2\alpha_{(1)}+(N-1)\times\Delta\alpha\}}{2} + (\beta+\gamma)\times N\\ &= \frac{2^{16}\times\{2\times0+(2^{16}-1)\times0.5\}}{2} + 0.5\times 2^{16}\\ &= 2^{14}\times(2^{16}-1) + 2^{15}\\ &= 2^{30} - 2^{14} + 2^{15} \cong 2^{30}\\ &= 1{,}073{,}741{,}824[\text{sec}] \to \frac{1{,}073{,}741{,}824}{60\times 60\times 24\times 365}\\ &\cong 34.04[\text{years}]\end{aligned}$$

According to the present exemplary embodiment, by adding the password write mask circuit 112 that masks writing to the password register, if not in the $\beta$ period, authentication fails even if a legitimate password is written into the password register 121. Therefore, a malicious analyzing entity judges that a password that has failed in authentication is not a legitimate password and stops using it in analysis attempts. As a result, the probability of a legitimate password being leaked decreases, and it is possible to improve security strength.

Figure 6:
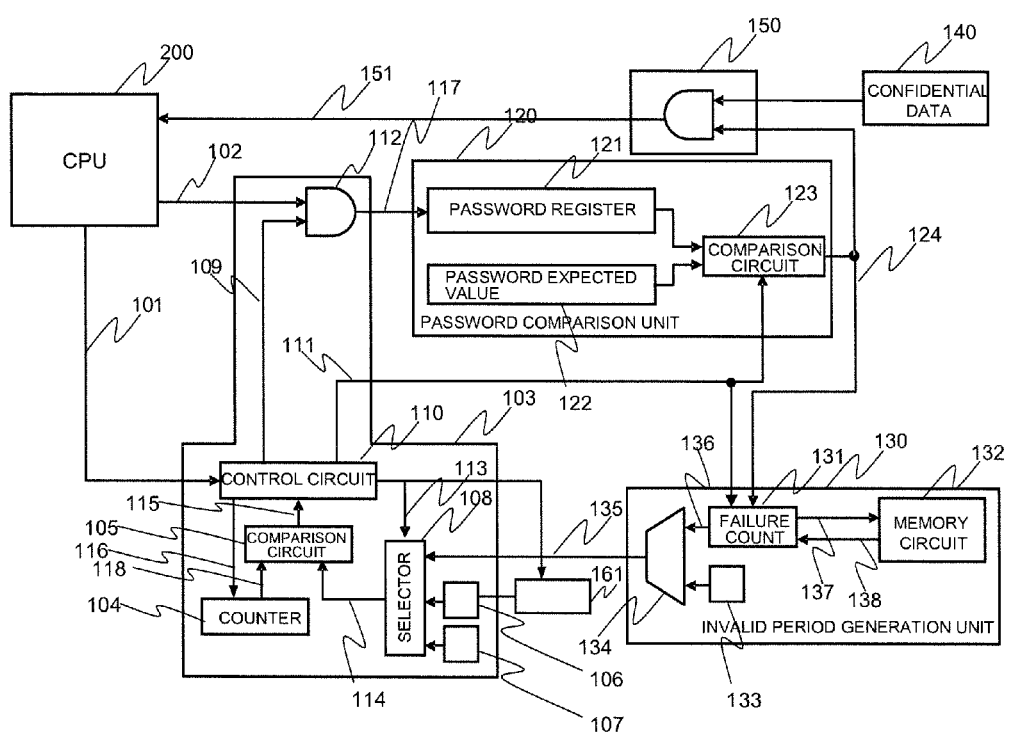
FIG. 6 is a diagram illustrating a modified example of the exemplary embodiment.

Referring to FIG. 6 illustrating a modified example of the exemplary embodiment, there is provided an authentication valid period variation circuit 161 that sets variably the value 106 indicating an authentication valid period. In the configuration shown in FIG. 6, every time the authentication valid period variation circuit 161 indicates that the signal 113 indicating an authentication period from the control circuit 110, is "authentication valid period", the value indicating the authentication valid period is varied in sequence, set to the value 106 indicating the authentication valid period, and supplied to the selector 108. The authentication valid period variation circuit 161 may have a configuration in which the value indicating the authentication valid period is initialized when resetting is performed or the authentication start signal 101 is activated. Or, the authentication valid period variation circuit 161 may have a configuration in which a random number (pseudorandom number) greater than or equal to 0 and less than 1 for example is generated, and based on the random number, an integer between a lower limit and upper limit of the value 106 indicating the authentication valid period is changed and set to the value 106 that indicates the authentication valid period.

By varying a predetermined period (time in which password input is enabled) of the authentication valid period, it is possible to make it difficult to analyze the timing of input of a password that is a target of authentication (when has the password received been authenticated?) and to perform analysis for a legitimate password, and it is possible to prevent divulging of a legitimate password by a brute force attack.

In the abovementioned exemplary embodiments, a division is made into the first period (invalid period) in which password input is invalid, and the second period in which password input is valid, and the second period is divided into the authentication valid period (the first predetermined period) and the authentication waiting period (a second predetermined period), but clearly it is possible to further increase the number of divisions with regard to the second period, as in a first authentication valid period and a first authentication waiting period, a second authentication valid period and a second authentication waiting period..., and the like.

In generating the first period (invalid period) in which password input is invalid, similar to the abovementioned modified example, the invalid period generation unit 130 clearly may supply, as the first period to the selector 108, a value obtained by further adding a random number to the value of the first period generated based on the authentication failure count.

It is to be noted that the various disclosures of the abovementioned Patent Literature are incorporated herein by reference thereto. Modifications and adjustments of embodiments and examples are possible within the bounds of the entire disclosure (including the scope of the claims), and also based on fundamental technological concepts thereof. Furthermore, a wide variety of combinations and selections of various disclosed elements (respective elements of the respective claims, respective elements of the respective exemplary embodiments, respective elements of the respective drawings, and the like) is possible within the scope of the claims of the present invention. That is, the present invention clearly includes every type of transformation and modification that a person skilled in the art can realize according to the entire disclosure including the scope of the claims and to technological concepts thereof.

What is claimed is:

1. A password authentication circuit comprising:
a control unit, a password comparison unit, and a first period generation unit, wherein
the control unit includes:
a timer that performs time measurement of each period of at least a first period and a second period, wherein a password authentication period is divided into at least the first period and the second period; and
a control circuit that performs control, based on the time measurement of the each period by the timer, such that, in the first period, sets a password register write enable signal to an inactive state to disable writing of a password received into a password register,
in a first predetermined period within the second period, sets the password register write enable signal to an active state to enable writing of a password received into the password register, and
in a second predetermined period different from the first predetermined period within the second period, sets the password register write enable signal to an inactive state to disable writing of a password received into a password register, wherein
the password comparison unit includes:
the password register; and
a comparison circuit that compares a password written into the password register and a password expected value to perform authentication of the password received; and wherein
the first period generation unit generates a signal having a value corresponding to a length of the first period for supply to the timer to control variably the first period,
in a case of there being a plurality of passwords written into the password register within the first predetermined period of the second period, a password last written into the password register being made a target for authentication.

2. The password authentication circuit according to claim 1, wherein the timer comprises:
a counter to measure time;
a comparison circuit that compares a count value of the counter and a timer setting value and outputs a match signal to the control circuit when the count value of the counter and the timer setting value match; and
a selector that receives, as first to third inputs, a value of the first period supplied from the first period generation unit, a value of the first predetermined period and a value of the second predetermined period within the second period, receives a control signal, as a selection signal, indicating which of the first period, the first predetermined period within the second period, and the second predetermined period within the second period, is an authentication period, output from the control circuit to select one of the first to third inputs to be output as the timer setting value of the comparison circuit.

3. The password authentication circuit according to claim 2, wherein the first period generation unit comprises
a circuit that generates the signal having a value indicating a length of the first period, the length of the first period corresponding to a failure count of password authentication, based on the password comparison result in the password comparison unit and supplies the generated signal to the first input of the selector.

4. The password authentication circuit according to claim 1, further comprising
a password write mask circuit that receives the password register write enable signal from the control circuit and a password received, and performs control such that, when the password register write enable signal is in an inactive state, the password received is masked and not supplied to the password register, and when the password register write enable signal is in an active state, the password received is supplied to the password register and written thereinto.

5. The password authentication circuit according to claim 3, wherein
the control circuit, on receipt of an authentication start signal, transitions to a state of the first period, outputs a signal to initialize the counter, sets the password register write enable signal to an inactive state, and supplies the control signal to the selector to select the first input and to make the selected first input of the selector a timer setting value in the comparison circuit in the timer,
the control circuit, on receipt of the match signal output from the comparison circuit in the timer, transitions to a state of the first predetermined period within the second period, outputs an initialization signal to initialize the counter, sets the password register write enable signal to an active state, and outputs the control signal to the selector to select the second input and to make the selected second input of the selector a timer setting value in the comparison circuit in the timer, the control circuit, on receipt of the match signal output from the comparison circuit, transitions to a state of the second predetermined of the second period, puts the password register write enable signal in an inactive state, and outputs the control signal to the selector to select the third input and to make the selected the third input of the selector a timer setting value in the comparison circuit in the timer, and the control circuit, on receipt of the match signal output from the comparison circuit, sets a password comparison valid signal to an active state, the password comparison unit compares a password written into the password register and a password expected value, and in a case where a comparison result by the password comparison unit does not give a match, the first period generation unit updates the failure count of password authentication.

6. The password authentication circuit according to claim 2, comprising a first predetermined period variable circuit that sets variably a length of the first predetermined period within the second period and supplies a signal having a value indicating the length of the first predetermined period to the second input of the selector.

7. The password authentication circuit according to claim 6, wherein the first predetermined period variable circuit receives from the control circuit a signal indicating which of the first period, the first predetermined period and the second predetermined period within the second period, is an authentication period, and varies the length of the first predetermined period of the second period.

8. An electronic device comprising:
the password authentication circuit as set forth in claim 1; and
a CPU that is enabled to access to data or a resource that is an access target thereof, based on a password authentication result by the password authentication circuit.

9. A password authentication method comprising:
performing time measurement of each period of at least a first period and a second period by a timer, wherein a password authentication period is divided into at least the first period and the second period;

performing control, via a control circuit and based on the time measurement of the each period by the timer, such that, in the first period, sets a password register write enable signal to an inactive state to disable writing of a password received into a password register, in a first predetermined period within the second period, sets the password register write enable signal to an active state to enable writing of a password received into the password register, and in a second predetermined period different from the first predetermined period within the second period, sets the password register write enable signal to an inactive state to disable writing of a password received into a password register;

comparing a password written into the password register and a password expected value to perform authentication of the password received; and generating a signal indicating a length of the first period for supply to the timer to control variably the first period, in a case of there being a plurality of passwords written into the password register within the first predetermined period of the second period, a password last written into the password register being made a target for authentication.

10. The method according to claim 9, comprising generating a signal having a value indicating a length of the first period, the length corresponding to a failure count of password authentication.

11. The method according to claim 9, comprising setting variably a length of the first predetermined period within the second period.

* * * * *